US011625423B2

(12) United States Patent
Moran et al.

(10) Patent No.: US 11,625,423 B2
(45) Date of Patent: Apr. 11, 2023

(54) LINEAR LATE-FUSION SEMANTIC STRUCTURAL RETRIEVAL

(71) Applicant: JPMORGAN CHASE BANK, N.A., New York, NY (US)

(72) Inventors: Sean Moran, Putney (GB); Fanny Silavong, London (GB); Rob Otter, Witham (GB); Brett Sanford, Tunbridge Wells (GB); Antonios Georgiadis, London (GB); Sae Young Moon, Edmonton (CA)

(73) Assignee: JPMORGAN CHASE BANK, N.A., New York, NY (US)

( * ) Notice: Subject to any disclaimer, the term of this patent is extended or adjusted under 35 U.S.C. 154(b) by 61 days.

(21) Appl. No.: 17/157,874

(22) Filed: Jan. 25, 2021

(65) Prior Publication Data

US 2022/0237182 A1    Jul. 28, 2022

(51) Int. Cl.
*G06F 16/33*    (2019.01)
*G06F 16/31*    (2019.01)

(52) U.S. Cl.
CPC .......... *G06F 16/334* (2019.01); *G06F 16/322* (2019.01)

(58) Field of Classification Search
None
See application file for complete search history.

(56) References Cited

U.S. PATENT DOCUMENTS

2016/0350283 A1* 12/2016 Carus .................... G06F 40/284

OTHER PUBLICATIONS

Iosif, Elias & Alexandros Potamianos, "Unsupervised Semantic Similarity Computation Between Terms Using Web Documents", IEEE Transactions on Knowledge and Data Engineering, vol. 22, No. 11, Nov. 2010, pp. 1637-1647. (Year: 2010).*
Murakami, Naoya & Hidehiko Masuhara, "Optimizing a Search-Based Code Recommendation System", IEEE RSSE 2012, pp. 68-72. (Year: 2012).*
Sarkar, Dipanjan, "Text Analytics with Python: A Practical Real-World Approach to Gaining Actionable Insights from Your Data", (2016) Springer Science & Business Media, Chapter 5 "Text Summarization", pp. 217-263. (Year: 2016).*
Luan, Sifei, et al., "Aroma: Code Recommendation via Structural Code Search", Oct. 2019, Proc. ACM Program. Lang., vol. 3, No. OOPSLA, Article 152, pp. 152:1-152:28. (Year: 2019).*
Silavong, Fran, et al., "Senatus—A Fast and Accurate Code-to-Code Recommendation Engine", In ACM 19th International Conference on Mining Software Repositories (MSR '22), May 23-24, 2022, Pittsburgh, PA, 13 pages. (Year: 2022).*

* cited by examiner

*Primary Examiner* — Scott A. Waldron
(74) *Attorney, Agent, or Firm* — Greenberg Traurig LLP

(57) ABSTRACT

Systems and methods for generating a fusion score between electronic documents. The method includes receiving a first electronic document by a document management system. The method further includes extracting a first set of features from the first electronic document including at least one feature type indicating the hierarchical structure of the first electronic document. The method also includes receiving a second electronic document by the document management server. The method further includes extracting a second set of features from the second electronic document including at least one feature type indicating the hierarchical structure of the second electronic document. The method further includes generating a fusion score based on a comparison of the first set of features and the second set of features.

11 Claims, 5 Drawing Sheets

LINEAR LATE-FUSION SEMANTIC STRUCTURAL RETRIEVAL

BACKGROUND OF THE INVENTION

1. Field of the Invention

The present disclosure generally relates to systems and methods for retrieving relevant information using multiple aspects of the structure.

2. Description of the Related Art

Electronic documents have been widely adopted as a means for facilitating collection, storage, or maintenance of information. The wide adoption of electronic documents has generated voluminous quantities across every organization and searching to find a document relevant to a particular query has presented an increasing challenge.

SUMMARY OF THE INVENTION

Systems and methods for generating a fusion score based on comparing sets of features extracted from electronic documents are disclosed. Certain embodiments involve extracting a set of features including a hierarchical structure of an electronic document and using the set of features to generate fusion scores between electronic documents. A document management system may extract features from a first electronic document. The features may include structural and semantic elements that may be used by the document management system to determine the type or content of the electronic document.

In one embodiment, the system and method include a document management server that receives a first electronic document. The method further includes extracting a first set of features from the first electronic document including at least one feature type indicating the hierarchical structure of the first electronic document. The method also includes receiving a second electronic document by the document management server. The method further includes extracting a second set of features from the second electronic document including at least one feature type indicating the hierarchical structure of the second electronic document. The method further includes generating a fusion score based on a comparison of the first set of features and the second set of features.

In some aspects, the method of extracting the first set of features may include extracting a tree path structure having a plurality of nodes from the first electronic document. For instance, each tree path structure may be a subset of the plurality of nodes that includes a particular arrangement of nodes (e.g., tree 1=node1_node2_node4_node3). The first electronic document may include a plurality of tree path structures.

In some aspects, the tree path structure includes semantic data for each node of the plurality of nodes. For instance, the semantic data may identify a position of each node within the tree path structure such as by including semantic data that is unique to the node's position within the tree path structure (e.g., a semantic meaning may be different for a different position of the node).

In some aspects, the method of generating the fusion score includes generating a weighted feature, by a machine learning model, for each feature of the first electronic document and the second electronic document. The method also may include computing a first similarity score between a first feature of the first electronic document and a second feature of the second electronic document. The method may also include computing the fusion score based on the first similarity score and the weighted feature.

In some aspects, computing the first similarity score may include computing a positive pointwise mutual information between the first feature and the second feature.

In some aspects, computing the first similarity score may include computing a term frequency-inverse document frequency between the first feature and the second feature. For example, the first similarity score may include computing how many times a word appears in the document (e.g., a first feature), and the inverse document frequency of the word across a set of documents (e.g., a second feature).

These illustrative embodiments are mentioned not to limit or define the disclosure, but to provide examples to aid understanding thereof. Additional embodiments are discussed in the detailed description and further description is provided there.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION

Figure 1:
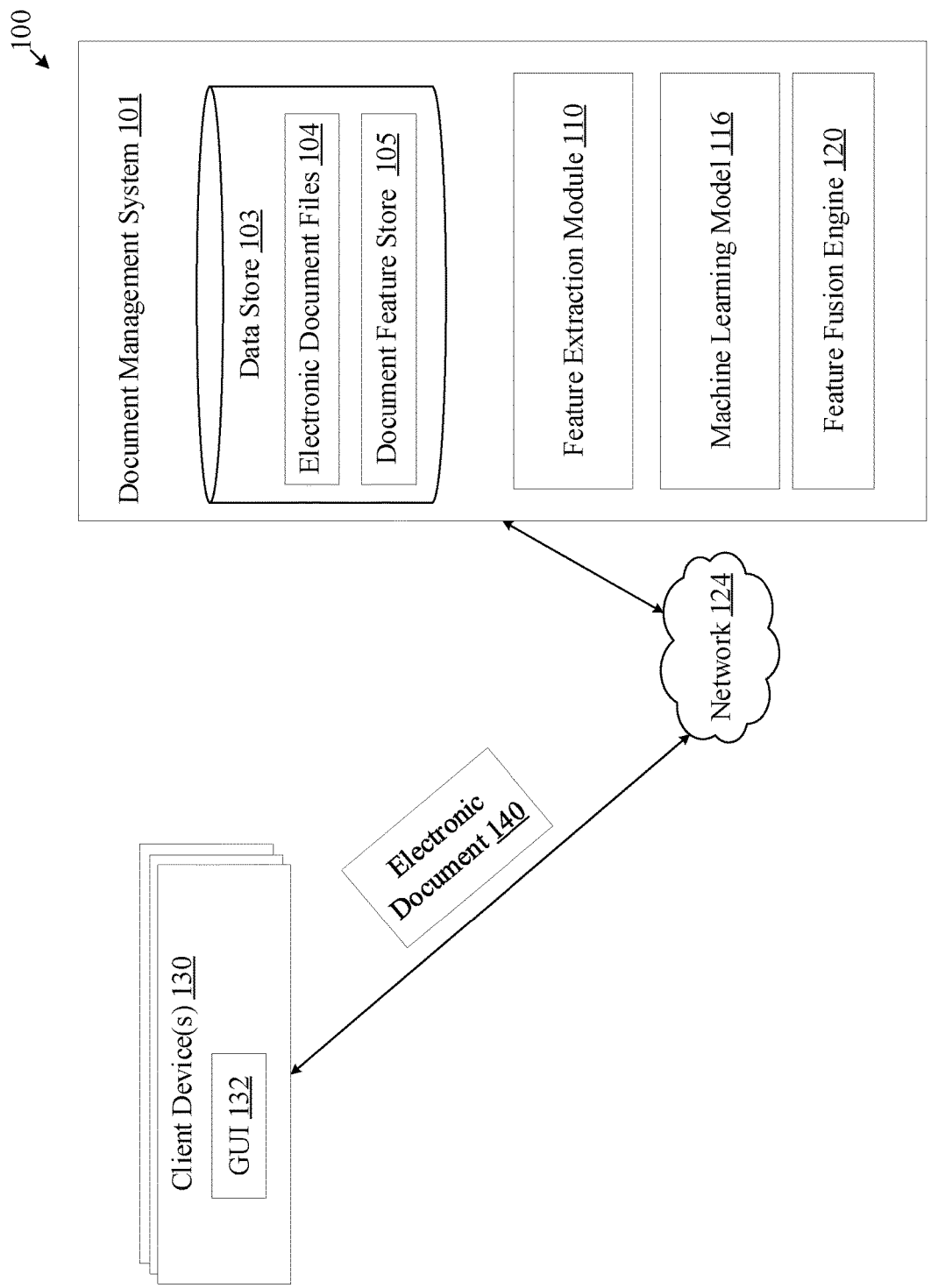
FIG. 1 depicts a system for generating a semantic fusion score of electronic documents, according to aspects of the present disclosure.

Embodiments are directed to systems and methods for generating a semantic fusion score of electronic documents, according to aspects of the present disclosure. For instance, an electronic document may include multiple types of information including information, such as textual fields in the document, file name, metadata, document structure, and server responses, that may be associated with the type of electronic document. The document management server may extract the various types of information and represent each type of information using a feature representation. By representing multiple types of information as features of the electronic document, a more relevant comparison between documents may be achieved.

The following non-limiting example is provided to introduce certain embodiments. In this example, an electronic document management system generates a fusion score between features of a first electronic document and a second electronic document. The document management may server may receive a first electronic document. The document management server may receive the first electronic document from a client device, another document management server, or from a similar computing device. The document management server may extract a first set of features from the first electronic document using a machine learning model or another featurization application. The first set of features may include a feature that indicates the hierarchical structure of the first electronic document. The hierarchical structure may be indicated by file name, text with semantic meanings that describe a file structure (e.g., "table", "form", etc.) or content of the electronic document, or the like. The document management system may also receive a second electronic document. The document management system may extract a second set of features from the second electronic document using a machine learning model or another featurization application. The second set of features may include a feature that indicates the hierarchical structure of the second electronic document. The document management system may generate a fusion score based on a comparison of the first set of features and the second set of features. The document management system may generate the fusion score by using a feature fusion engine that determines a similarity by applying a machine learning model to the first electronic document and the second electronic document using the first set of features and the second set of features.

Continuing with the present example, the document management system extracts the first set of features that includes extracting a tree path structure including multiple nodes from the first electronic document. The tree path structure may include semantic data that identifies a position of each node within the tree path structure (e.g., each node may have semantic data). Each node may have semantic data that is unique to the node's position within the tree path structure (e.g., a semantic meaning may be different (e.g., node 2 in tree path 1) for a different position of the node (node 2 in tree path 2), such as tree path 2 being a portion of tree path 1 that starts at node 2. The document management system computes a fusion score by generating a weighted feature, by a machine learning model, for each feature of the first electronic document and the second electronic document. The document management system further computes the fusion score by computing a first similarity score between a first feature of the first electronic document and a second feature of the second electronic document. The document management system computes the fusion score based on a combination of the first similarity score and the weighted feature.

In one aspect, the document management system computes the first similarity score using a positive pointwise mutual information between the first feature and the second feature.

In another aspect, the document management system computes the first similarity score including computing a term frequency-inverse document frequency for each document.

Referring now to the Figures, FIG. 1 depicts a system for generating a semantic fusion score of electronic documents, according to aspects of the present disclosure. System 100 may include a document management system 101, one or more client devices 130, and a network 124. It should be noted that these entities are exemplary only; additional, fewer, and/or different entities may be provided as is necessary and/or desired.

For instance, the document management system 101 may receive an electronic document 140 from client device 130. In one example, the electronic document 140 is an electronic file that includes any combination of text, images, or other data that stores information. The document management system 101 may include a feature extraction module 110, a machine learning model 116, a feature fusion engine 120, and a data store 103.

The client device(s) 130 may include a graphical user interface (GUI) 132 that provides an interface for selecting an electronic document and transmitting the electronic document 140 from the client device(s) 130 to the document management system 101 via the network 124. The client device(s) 130 may also generate the electronic document 140 as a response to input received by the GUI 132 from the user of the client device(s) 130.

The feature extraction module 110 extracts one or more features from the electronic document 140. In one example, the feature extraction module 110 may extract features from the electronic document 140 including a feature that indicates the hierarchical structure of the electronic document 140, one or more features that represent text or image content of the electronic document 140, and one or more features that represent a previous response of the document management server in response to the electronic document 140. An example of the features that represent the hierarchical structure of the electronic document 140 include feature vectors that represent tree-based features (e.g. the paths of nodes in an XML/JSON data source). The feature extraction module 110 may also generate a feature representation of a server response (e.g., a response to an HTTP request) associated with the document. In other aspects, the feature extraction module 110 may generate feature representations of application programming interface (API) corresponding to the electronic document 140 (e.g., a header, a version, a programming language) or file type such as PDF, XML, HTML, or the like. Additional detail with regard to feature extraction is discussed at least with respect to FIG. 3.

In one aspect, the feature extraction module 110 may extract a tree structure from the electronic document. The feature extraction module 110 may extract one or more tree paths associated with the electronic document. The feature extraction module 110 may vectorize the tree paths to represent the one or more tree paths of the electronic document.

In another aspect, the feature extraction module 110 may extract text content from the electronic document. The feature extraction module 110 may extract one or more fields of text, such as flat text, associated with (e.g., metadata) or contained in the electronic document. The feature extraction module 110 may vectorize the text fields to represent the one or more text fields of the electronic document. Additionally, or alternatively, the feature extraction module 110 may extract the text and generate semantic relationships based on the text.

The document management system 101 may store the electronic document 140 in the data store 103, such as in electronic document files 104. The document management system 101 may also store the extracted features in document feature store 105. In some embodiments, the document management system may store one of the electronic document 140, the extracted features, or any combination thereof.

The client device(s) 130 may submit a second electronic document and request from the document management system 101 to return a set of relevant documents similar to the second electronic document. The document management system 101 may extract a second set of features from the second electronic document using a machine learning model or another featurization application. The second set of features may include a feature that indicates the hierarchical structure of the second electronic document. The document management system may compare the extracted features of the second electronic document with previously extracted features of one or more stored electronic documents. The document management system may generate a fusion score based on a comparison of the first set of features from the first electronic document (e.g., the stored electronic document features) and the second set of features. The document management system may generate the fusion score by using a feature fusion engine that determines a similarity by applying a machine learning model to the first electronic document and the second electronic document using the first set of features and the second set of features. In one example, the features can represent semantic of a tree path structure, semantics of text included in various fields, server responses associated with the electronic document, or the like.

The machine learning model 116 may be trained to generate a set of weights that correspond to the set of features from the electronic documents. In one example, the machine learning model 116 may determine that a subset of features from the set of features may be more relevant in determining the content, purpose, or type of documents. The machine learning model 116 may adjust the weights iteratively before, during, or after processing an electronic document. The machine learning model may additionally receive feedback from an expert system or a user (e.g., a user or another trained machine learning model) that provides an additional parameter, such as a quality score, to determine whether the weights generated by the machine learning model produced a fusion score above a threshold. In other words, the feedback may be used by the machine learning model to determine the weights that most accurately produce a maximum fusion score between a set of a first electronic document and the second electronic document.

The feature fusion engine 120 may generate a fusion score by comparing the sets of features between the first electronic document and the second electronic document. In one example, the feature fusion engine computes a similarity score between corresponding features of the first electronic document and the second electronic document.

In one aspect, the feature fusion engine computes a similarity score for a first tree structure of the first electronic document and a second tree structure of the second electronic document. An example of the tree structure is likely best understood with reference to FIG. 3.

Figure 2:
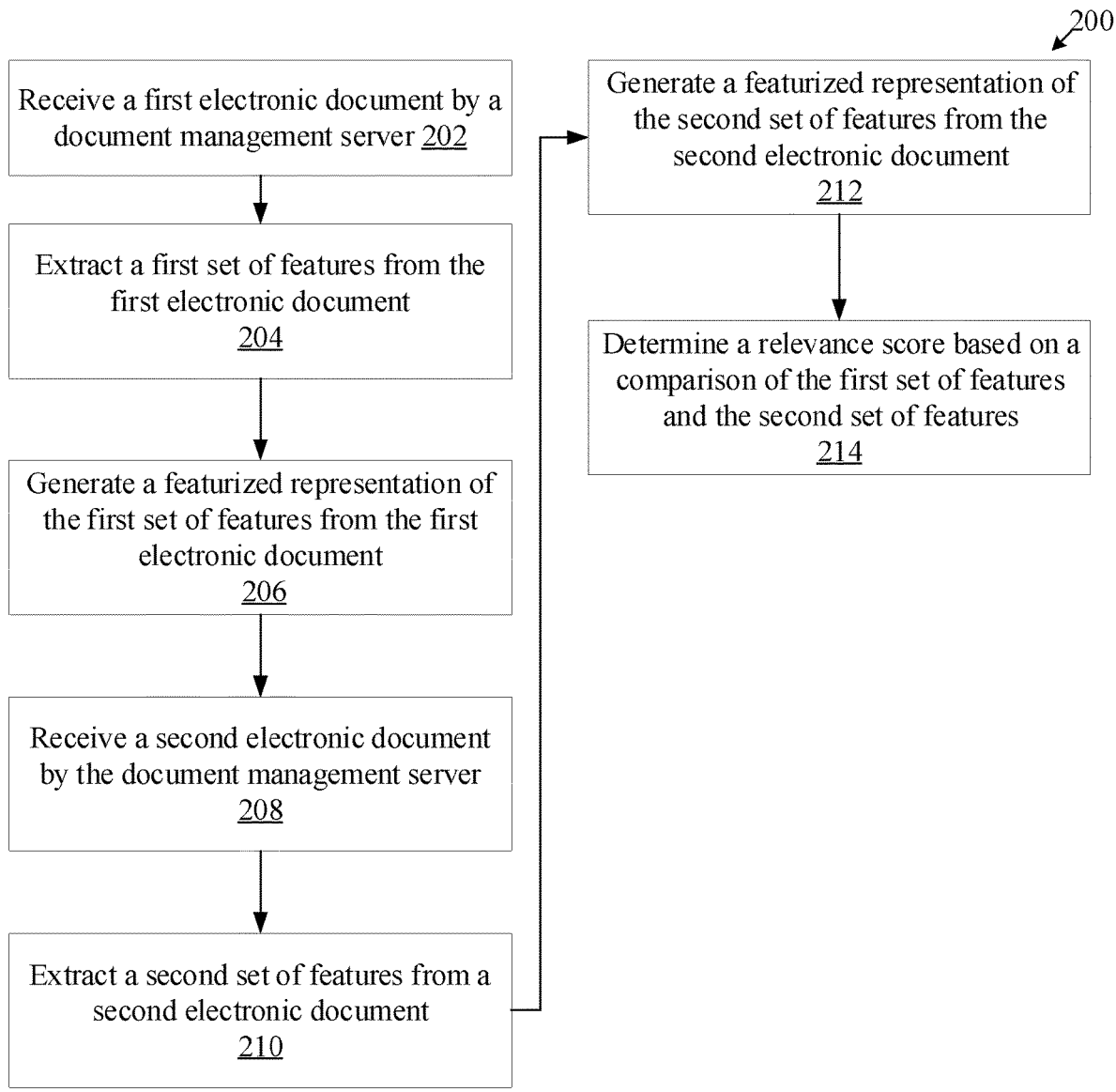
FIG. 2 depicts an example of a method for generating a semantic fusion score of electronic documents, according to aspects of the present disclosure.

FIG. 2 illustrates an example of a method for generating a semantic fusion score of electronic documents, according to aspects of the present disclosure.

In step 202, the process 200 involves receiving a first electronic document by the document management server. For example, the document management system 101 may receive a first electronic document, such as the electronic document, from a client device via a network. The document management server may be communicatively coupled to the network via a network interface device, such as an ethernet connection, wireless internet or cellular connection, Bluetooth, or any device or group of devices suitable for establishing a data connection to one or more data networks.

In step 204, the process 200 involves extracting a first set of features from the first electronic document. For example, the document management system may employ a feature extraction module to extract one or more features of the first electronic document.

In step 206, the process 200 involves generating a featurized representation of the first set of features from the first electronic document. The feature extraction module generates a feature representation of the first electronic document such as a feature vector that may include multiple features, each feature representing an individual measurable property of the first electronic document.

In step 208, the process 200 involves receiving a second electronic document by the document management server. The operations and processes of step 208 may be similar to the operations or processes of step 202.

In step 210, the process 200 involves extracting a second set of features from the second electronic document. The operations and processes of step 210 may be similar to the operations or processes of step 204.

In step 212, the process 200 involves generating a featurized representation of the second set of features from the second electronic document. The operations and processes of step 212 may be similar to the operations or processes of step 206.

In step 214, the process 200 involves determining a fusion score based on a comparison of the first set of features and the second set of features. For instance, the feature fusion engine may use positive pointwise mutual information to determine the relevance between electronic documents. Positive pointwise mutual information determines a difference between a probability of a coincidence between a first feature and a second feature and the individual probabilities of the first feature and the second feature assuming that the features are independent. An example of the computations of the similarity score is provided below. The feature fusion engine may compute a similarity score using the positive pointwise mutual information (ppmi) between features of the first electronic document features of the second electronic document. In this example, the frequency of a feature may be used to weight a ppmi value to compute the occurrence of a feature (e.g., $feature_j$) in an electronic document. In some cases, using the frequency weighting improves performance as it reduces noise for infrequent features and amplifies the impact of frequent features.

$$ppmi(feature_i, feature_j) = \max\left(\log_2 \frac{P(feature_i, feature_j)}{P(feature_i) * P(feature_j)}, 0\right)$$

$$ppmi(feature_i) = \begin{bmatrix} ppmi(feature_i, feature_0) \\ \vdots \\ ppmi(feature_i, feature_j) \end{bmatrix}$$

$$freq(api_i) = \begin{bmatrix} freq(feature_0) \\ \vdots \\ freq(feature_j) \end{bmatrix}$$

$$ppmi(api_i) = freq_{api_i} * ppmi(\text{feature})$$

In another example, the feature fusion engine may compute a feature using a Term-Frequency Inverse-Document-Frequency (TF-IDF) on the features of the first electronic document. An example of the computation of the fusion score using TF-IDF is provided below.

$$tf - idf(feature_i) = tf_i * \log\left(\frac{N}{df_i}\right)$$

$$tf - idf(api_i) = \begin{bmatrix} tf - idf(feature_0) \\ \vdots \\ tf - idf(feature_i) \end{bmatrix}$$

In yet another example, the feature fusion engine may compute a similarity score using a cosine similarity score to compute the similarities of the tree structure and text fields and an edit distance measurement to determine a similarity of the API endpoints of the electronic document. An example of the cosine similarity score is a measure of similarity between two non-zero vectors of an inner product space. The edit distance may be used to compare text or other strings to determine a number of operations required to transform a first text or string to a second text or string. The similarity score computation may be represented by the equation below. In the example below, api may represent an electronic document or other electronic file, tree may represent a vectorized and transformed textual description (e.g., a ppmi vector or a TF-IDF vector), text may represent a tokenized, vectorized, and transformed textual description, and endpoint may represent dictionary keys or xml tags as a string representation. Further in the example below, a first cosine similarity may compute the similarity of the tree path structure on a per-node basis, while a second cosine similarly may compute the similarity of the tree path structure at a level of the complete tree path structure.

$$\text{similarity}(api_i, api_{ji}) = \begin{bmatrix} \cos(tree_i, tree_j) \\ \cos(text_i, text_j) \\ EditDistance_{set}(endpoint_i, endpoint_j) \end{bmatrix}$$

The feature fusion engine may aggregate the similarity scores into the fusion score. In one example, the feature fusion engine performs a weighted linear combination of the similarity scores by weighting the similarity scores with the feature weight determined by the machine learning model. An example calculation of the fusion score is provided below.

sionScore($api_i,api_j$)=$\Sigma(\lambda_x$similarity($api_i,api_j$))+
    ($\lambda_y$mean(validatorScore$_{api_j}$))

Figure 3:
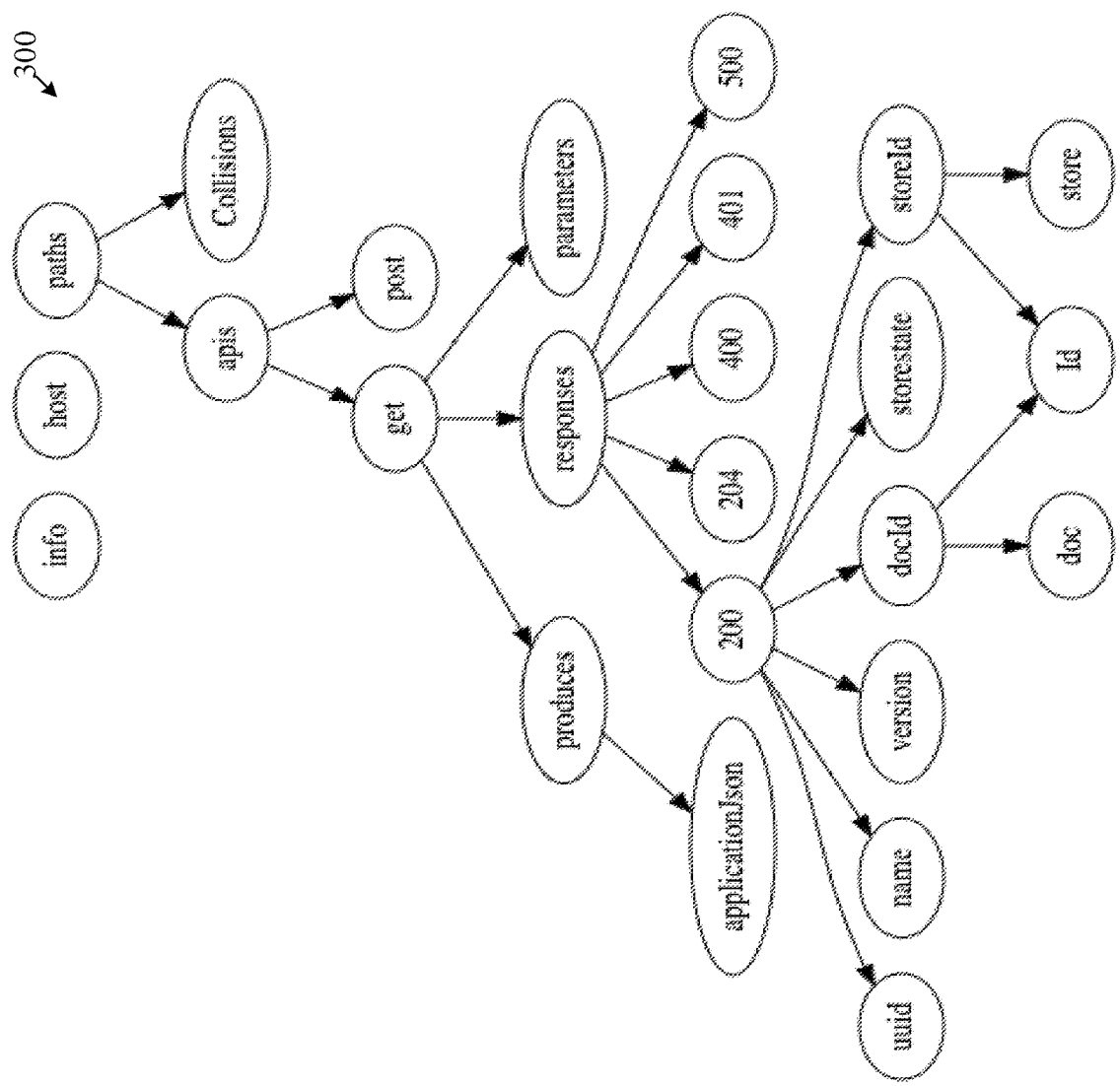
FIG. 3 depicts an example of a process of extracting features from an electronic document, according to aspects of the present disclosure.

FIG. 3 depicts an example of a process of extracting features from an electronic document, according to aspects of the present disclosure. For instance, the feature extraction module may extract tree paths 300 of the electronic documents. The tree paths 300 may include various nodes based on the structural hierarchy of the electronic document. An example of the tree paths 300 may be JSON, XML, HTML, or the like. The feature extraction module may extract the node relationships of the tree structure, the types of nodes, the number of nodes, the depth of the tree, or details of the nodes.

Figure 4:
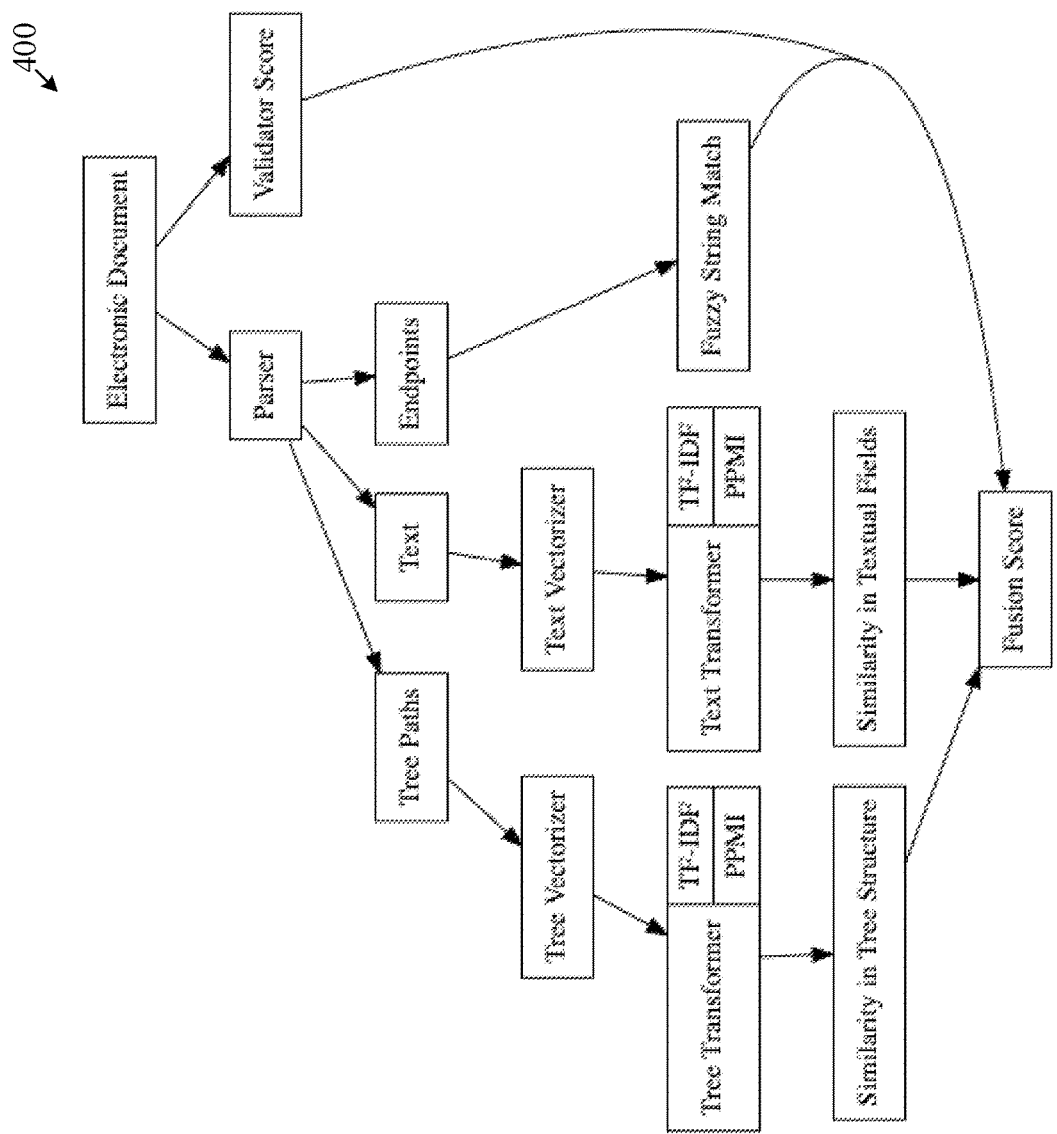
FIG. 4 depicts an example of a process for generating a fusion score between electronic documents, according to aspects of the present disclosure.

FIG. 4 depicts an example of a process for generating a fusion score between electronic documents, according to aspects of the present disclosure. For instance, the feature fusion engine may generate a fusion score that represents a similarity between electronic documents by combining multiple similarity scores of various features of the electronic documents. An example of a process for computation of the fusion score is described with one or more blocks of FIG. 2. The feature fusion engine may compute the fusion score between electronic documents, such as between stored documents, or a first electronic document that has been stored and a second electronic document that is received or selected subsequent to the first electronic document.

Figure 5:
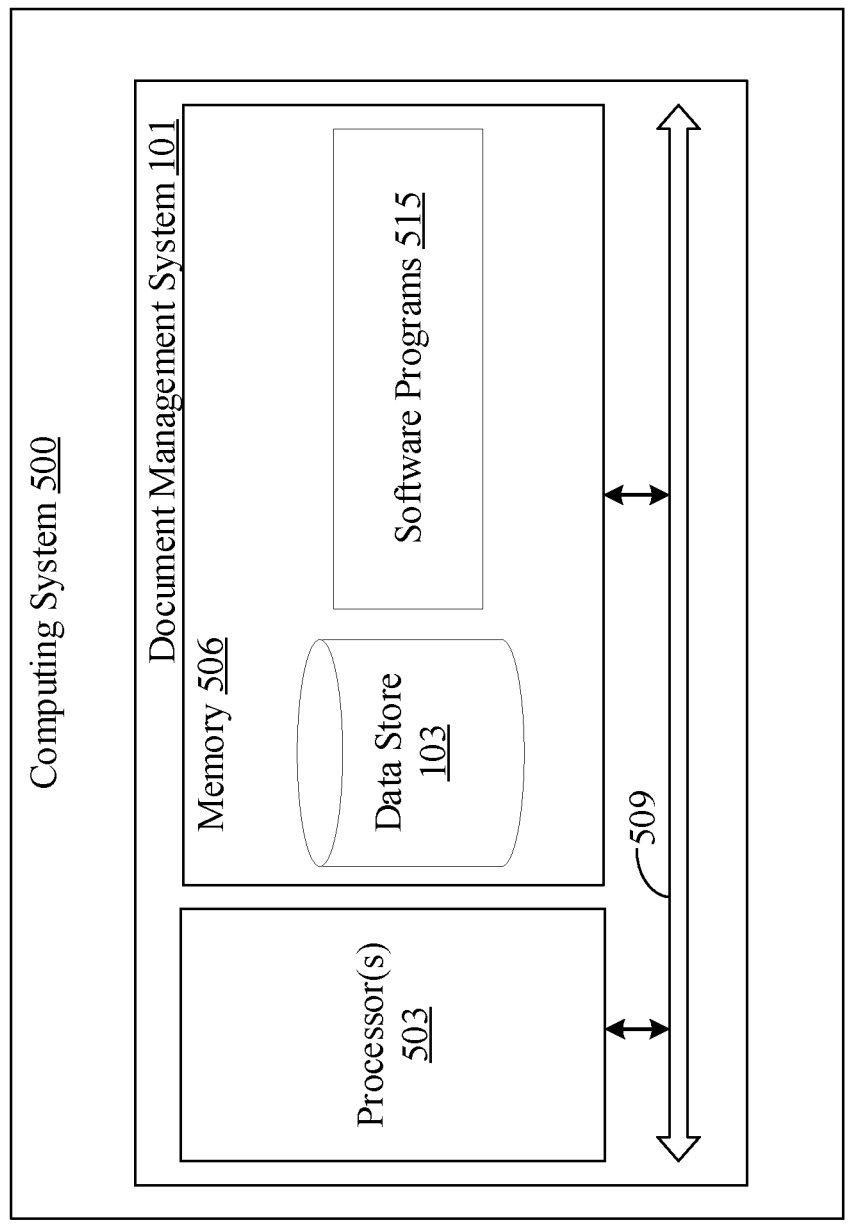
FIG. 5 depicts an example of a computing system for implementing certain aspects of the present disclosure.

FIG. 5 depicts an example of a computing system for implementing certain aspects of the present disclosure. For example, FIG. 5 depicts an example of computing system 500. The implementation of computing system 500 could be used for one or more of document management system 101. The depicted example of the computing system 500 includes a processor 503 coupled to a memory 506. The processor 503 executes computer-executable program code stored in memory 506, such as software programs 515. The processor 503 and the memory 506 may be coupled by a bus 509. In some examples, the bus 509 may also be coupled to one or more network interface devices (not shown).

It should be recognized that the embodiments and examples disclosed herein are not exclusive to each other; features and elements from one embodiment may be used with others as is necessary and/or desired.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention.

Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method comprising:
   receiving a first electronic document by a document management server comprising a computer processor;
   extracting a first set of features from the first electronic document, the first set of features comprising a hierarchical structure of the first electronic document and a content of the first electronic document;
   receiving a second electronic document by the document management server;
   extracting, by the document management server, a second set of features from the second electronic document, the second set of features comprising a hierarchical structure of the second electronic document and a content of the second electronic document;
   generating, by the document management server, a similarity score for each feature by comparing each feature in the first set of features to a corresponding feature in the second set of features;
   generating a weighted feature, by a machine learning model, for each feature of the first electronic document and the second electronic document, the weighted feature based on feedback from a previous similarity score; and
   generating, by the document management server, a fusion score comprising a weighted combination of the similarity scores, wherein the weighted combination is based on the weighted feature, and the fusion score represents a similarity between the first electronic document and the second electronic document.

2. The method of claim 1, wherein the step of extracting the first set of features comprises extracting a tree path structure from the first electronic document, wherein the tree path structure comprises a plurality of nodes.

3. The method of claim 2, wherein the tree path structure further comprises semantic data for each node of the plurality of nodes, wherein the semantic data identifies a position of each node within the tree path structure, and wherein the semantic data includes structural and contextual information corresponding to each node.

4. The method of claim 1, wherein generating the similarity score for each feature further comprises computing a positive pointwise mutual information between each feature and the second feature.

5. The method of claim 1, wherein the similarity score for each feature is further generated using a term frequency-inverse document frequency between each feature and the second feature.

6. A system for generating a fusion score for electronic documents, the system comprising:
   a document management system comprising at least one memory storing executable instructions and a processor configured to execute instructions, which cause the processor to perform operations comprising:
   receive a first electronic document;
   extract a first set of features from the first electronic document, the first set of features comprising a hierarchical structure of the first electronic document and a content of the first electronic document;
   receive a second electronic document;
   extract a second set of features from the second electronic document, the second set of features comprising a hierarchical structure of the second electronic document and a content of the second electronic document;
   generate a similarity score for each feature by comparing each feature in the first set of features to a corresponding feature in the second set of features;
   generating a weighted feature, by a machine learning model, for each feature of the first electronic document and the second electronic document, the weighted feature based on feedback from a previous similarity score; and
   generating a fusion score comprising a weighted combination of the similarity scores, wherein the weighted combination is based on the weighted feature, and the fusion score represents a similarity between the first electronic document and the second electronic document.

7. The system of claim 6, wherein the operation of extracting the first set of features comprises extracting a tree path structure from the first electronic document, wherein the tree path structure comprises a plurality of nodes.

8. The system of claim 7, wherein the tree path structure further comprises semantic data for each node of the plurality of nodes, wherein the semantic data identifies a position of each node within the tree path structure.

9. The system of claim 6, wherein the operation of generating the similarity score for each feature comprises computing a positive pointwise mutual information between each feature and the second feature.

10. The system of claim 6, wherein the similarity score for each feature is further generated using a term frequency-inverse document frequency between each feature and the second feature.

11. The system of claim 6 further comprising a client device communicatively coupled to the document management system and operable to communicate the first electronic document or the second electronic document to the document management system.

\* \* \* \* \*